(12) United States Patent
Brogårdh et al.

(10) Patent No.: US 6,336,374 B1
(45) Date of Patent: Jan. 8, 2002

(54) DEVICE FOR RELATIVE DISPLACEMENT OF TWO ELEMENTS

(75) Inventors: Torgny Brogårdh; Staffan Ellqvist, both of Västerås (SE)

(73) Assignee: Asea Brown Boveri A.B., Västerås (SE)

( * ) Notice: Subject to any disclaimer, the term of this patent is extended or adjusted under 35 U.S.C. 154(b) by 0 days.

(21) Appl. No.: 09/341,307

(22) PCT Filed: Jan. 14, 1997

(86) PCT No.: PCT/SE98/00047

§ 371 Date: Sep. 3, 1999

§ 102(e) Date: Sep. 3, 1999

(87) PCT Pub. No.: WO98/30367

PCT Pub. Date: Jul. 16, 1998

(30) Foreign Application Priority Data

Jan. 14, 1997 (SE) .................................. 9700091

(51) Int. Cl.⁷ .............................. B25J 9/10; B25J 11/00
(52) U.S. Cl. ............................... 74/490.03; 74/490.05; 901/16
(58) Field of Search .................. 74/490.01, 490.03, 74/490.05; 901/16, 23, 27, 28

(56) References Cited

U.S. PATENT DOCUMENTS

| 4,329,110 A | 5/1982 | Schmid |
| 4,329,111 A | 5/1982 | Schmid |
| 4,341,502 A | 7/1982 | Makino |
| 4,483,074 A | 11/1984 | Rudzyanskas et al. |
| 4,522,555 A | 6/1985 | Inoue et al. |
| 4,725,178 A | 2/1988 | Reis et al. |
| 4,976,582 A | 12/1990 | Clavel |
| 5,107,719 A | 4/1992 | Kota |
| 5,562,012 A | 10/1996 | Nishi et al. |
| 5,577,414 A | 11/1996 | Ogawa et al. |
| 5,622,084 A | 4/1997 | Telldén |
| 5,656,905 A | * 8/1997 | Tsai ...................... 318/568.21 |
| 5,816,105 A | * 10/1998 | Adelstein .................. 74/471 X |
| 5,931,832 A | * 8/1999 | Jensen ............................ 606/1 |
| 6,095,011 A | * 8/2000 | Brogardh ................. 74/490.03 |

FOREIGN PATENT DOCUMENTS

| DE | 2938767 | 1/1981 |
| DE | 3445055 | 6/1986 |
| EP | 0464129 | 1/1992 |
| EP | 0658403 | 6/1995 |
| SE | 502256 | 9/1995 |
| WO | WO 89/01391 | 2/1989 |
| WO | WO 97/33726 | 9/1997 |

* cited by examiner

Primary Examiner—David Fenstermacher
(74) Attorney, Agent, or Firm—Connolly Bove Lodge & Hutz LLP.

(57) ABSTRACT

Arm consisting of angularly displaceable linkages (1, 2, 3), such as a manipulator, having a fixed end carried by a support (4) and a free end carrying a tool or workpiece (7), whereby each hinge is provided with controllable blocking means for the purpose of immobilizing said linkages relative to each other, wherein a member counter-balancing the torque is arranged at one or more pivot axes to compensate the weight of said linkages freely movable relative to a hinge towards said free end.

18 Claims, 8 Drawing Sheets

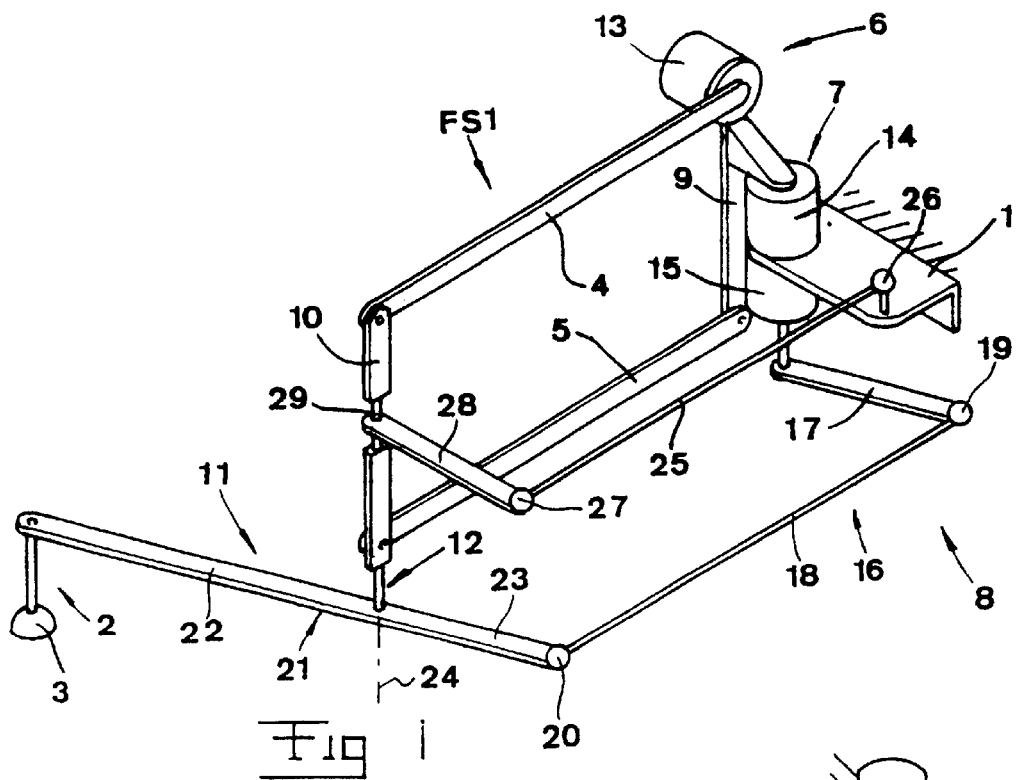
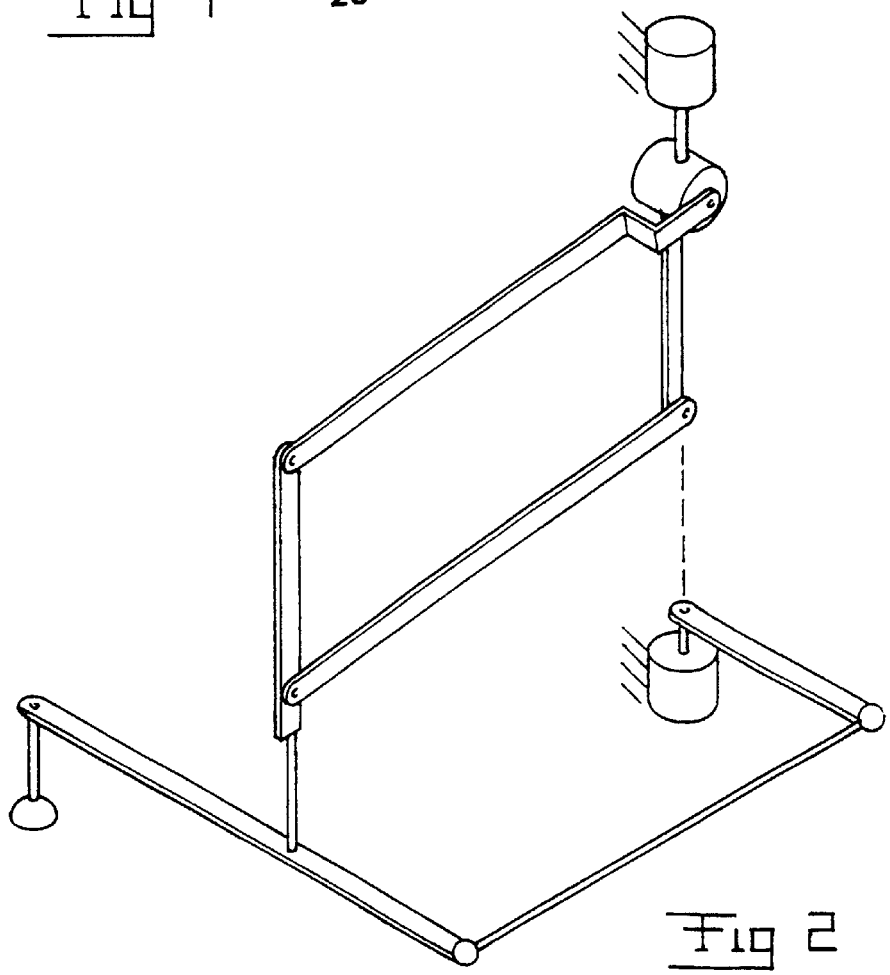

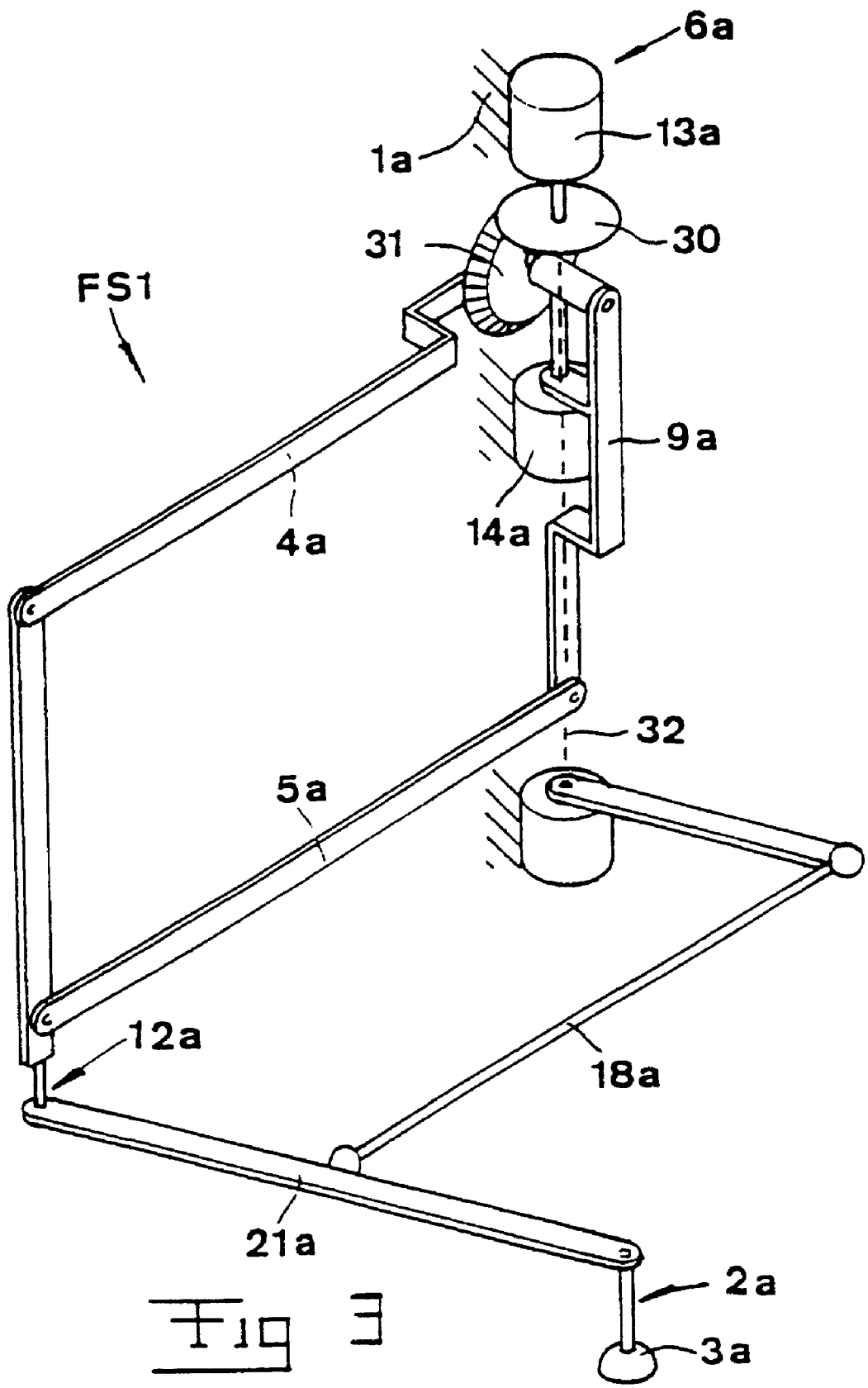

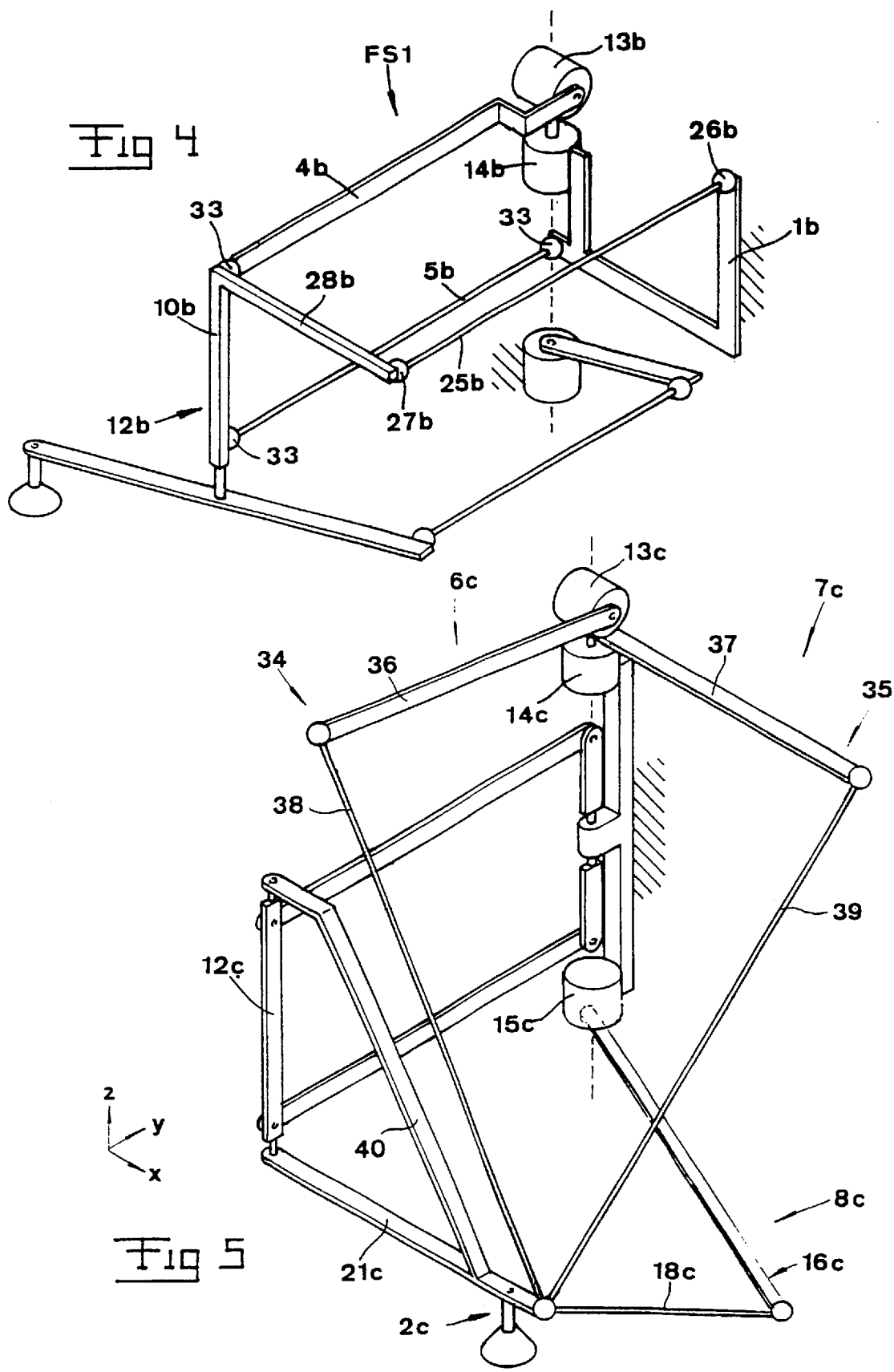

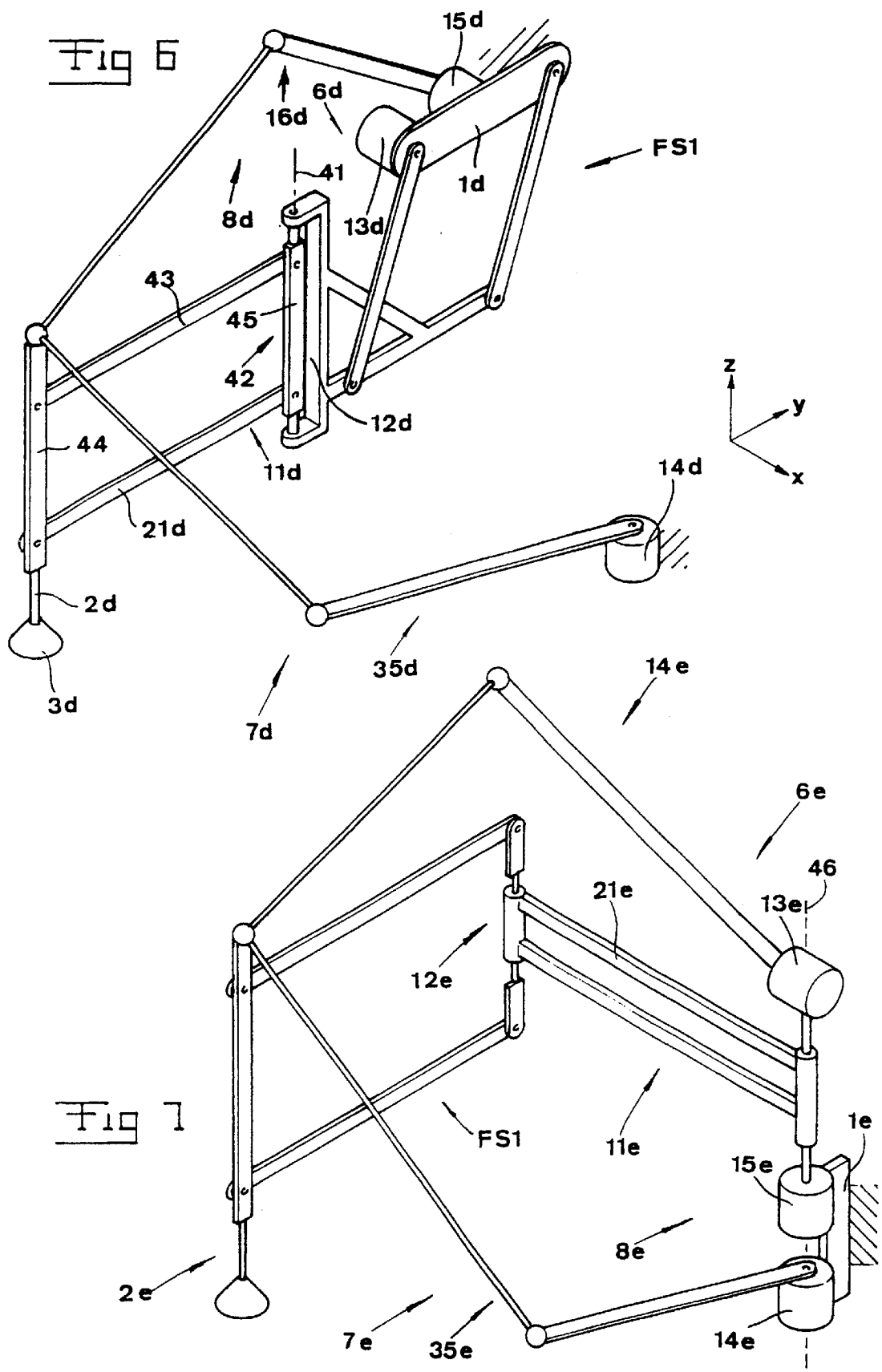

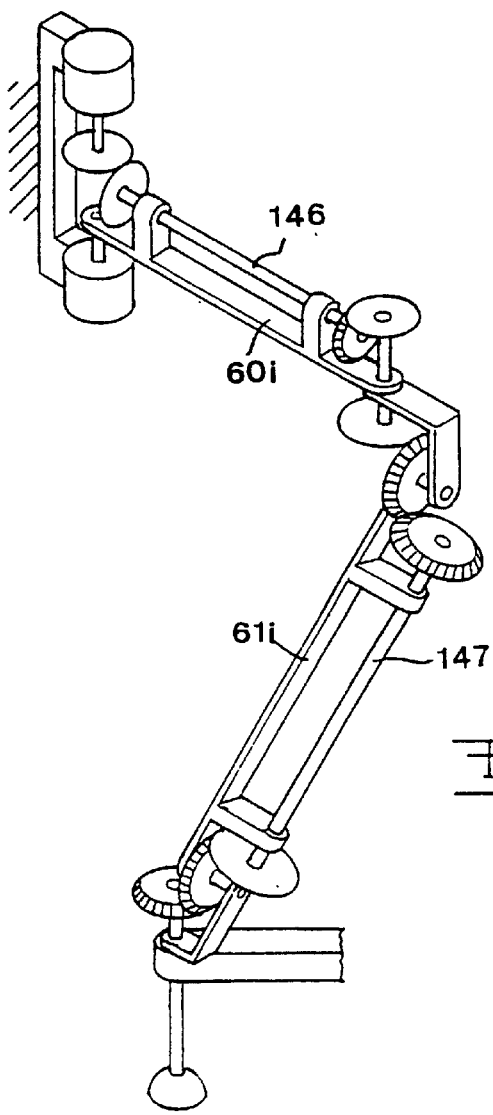
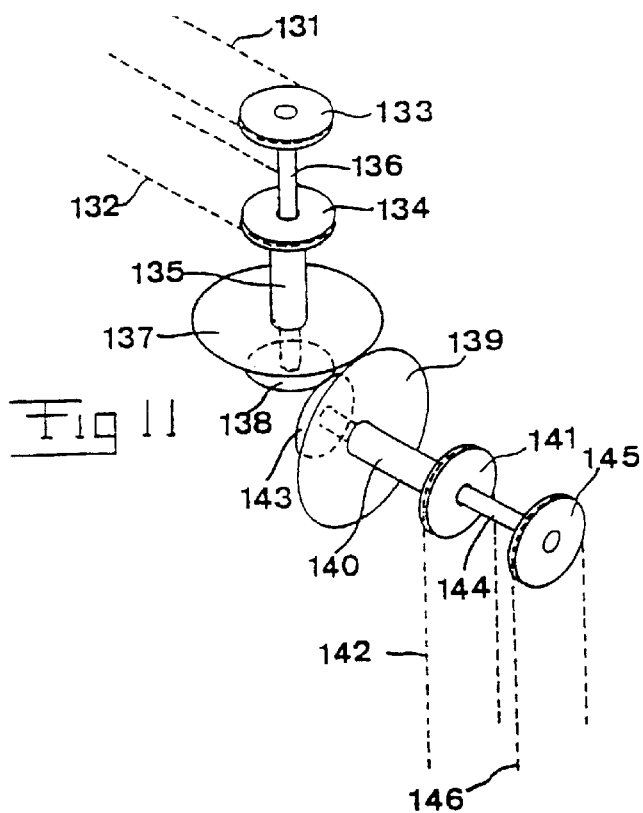
Fig 12
Fig 11

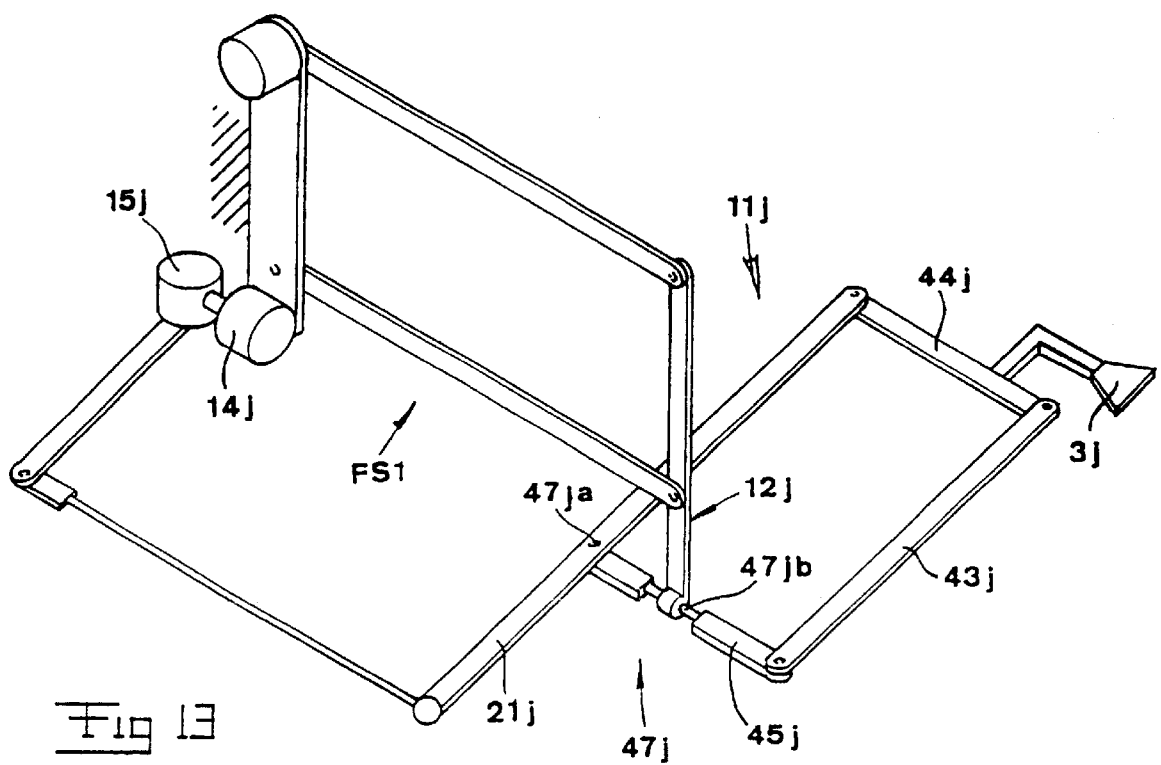

DEVICE FOR RELATIVE DISPLACEMENT OF TWO ELEMENTS

FIELD OF THE INVENTION

This invention is related to a device for relative displacement of two elements comprising articulated links arranged between the elements and force-applying arrangements for applying force for the relative displacement of the elements.

The relative displacement of the two elements has the purpose to position them mutually in a manner aimed at by means of the force-applying arrangements. More specifically, the device according to the invention is intended to form a manipulator or robot. The second of the elements is intended to carry, directly or indirectly via a carrying arrangement, a working member to execute the function aimed at, for instance picking, placing, packing and palletising. However, it is remarked that the working member may be adapted to carry out also other work operations than those just mentioned. The first element may according to a first embodiment form a base member secured in space but could according to a second embodiment form a base member with the character of a carrier movable in relation to a carcass. A force-applying arrangement then serves for adjusting the position of the carrier in relation to the carcass.

PRIOR ART

A robot of the kind defined by way of introduction is described in U.S. Pat. No. 4,976,582. For the positioning of the second element, the robot comprises three force-applying arrangements, which in unison comprise three force-exerting members arranged in a triangular distribution on the first element. Each of the force members is connected to the movable second element via its own connection comprising two link arrangements and an intermediate connection arrangement. These three connections coupled in parallel are likewise arranged in a triangular distribution. Each of these connections comprises a first link arrangement including two first links pivotably connected to the second element and a second link, which is rigidly connected to a movable portion of the force-exerting member and which by means of a connection arrangement is connected to the two first links. The second link is movable with regard to one single degree of freedom relative to the stationary portion of the force-exerting member. The connection arrangement connects the first and second links in a hinged manner with two but not more than two degrees of freedom. The link arrangement formed by the first links is connected to the second element so that likewise two but not more than two degrees of freedom occur. In reality, the first link arrangements form parallelogram-shaped four-links systems. A disadvantage with this known type of robot is that it becomes comparatively bulky as a consequence of the triangular distribution discussed hereinabove. The angle between planes of pivoting for two adjacent second links must, namely, always be less than 180°. Thus, it is very difficult to arrange two or more of those robots closely to each other without collision. A further disadvantage is that all arms must be of equal length. This implies that it is not possible to optimise the robot to the pattern of movement in question. Performance will always be symmetrically distributed in a symmetrical working area, which is not cost efficient.

As a consequence of the equilateral triangular construction of the known robot it is also difficult to arrange to work horizontally above conveyors, loading pallets etc.

OBJECT OF THE INVENTION

This invention aims at devising routes to develop the device of the kind defined by way of introduction so as to eliminate or at least reduce one or more of the disadvantages mentioned hereinabove. A particular aim is to provide a greater flexibility as to the design of the device so that two or more devices may be placed to work comparatively close to each other. According to a further aspect, the aim is to provide an enhanced movability of the robot.

SUMMARY OF THE INVENTION

The object of the invention is achieved in that the articulated links form at least one four-links system, that the device also comprises at least one pivot arm arrangement and that the fourlinks system and the pivot arm arrangement are mutually connected by means of a connection arrangement.

The invention creates possibilities for an asymmetrical design of the device according to the invention and accordingly a design adapted for the purpose of the working area thereof. For instance, this asymmetrical character of the device according to the invention provides possibilities for a very dense packing of a plurality of robots.

Several preferable developments of the invention are defined in the dependent claims. These developments and advantages in connection with the invention are dealt with more specifically in the following description.

SHORT DESCRIPTION OF THE DRAWINGS

With reference to the enclosed drawings a more close description of embodiment examples of the invention follows hereunder.

In the drawings;

FIG. 1 is schematical perspective view of the robot according to the invention,

FIG. 2 is a view similar to FIG. 1, but illustrating a modified embodiment,

Figure 9:
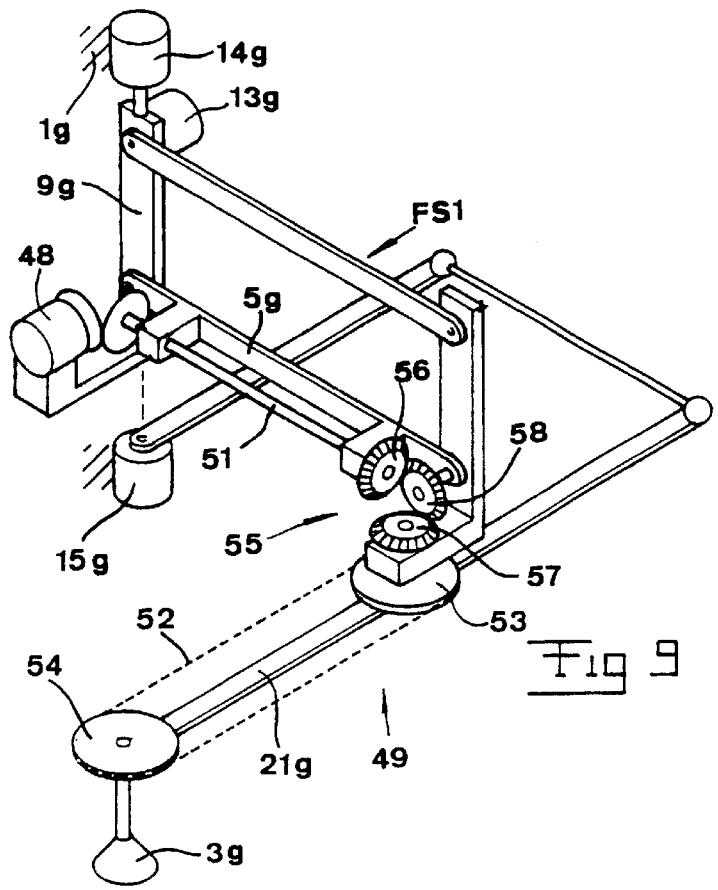
Figure 8:
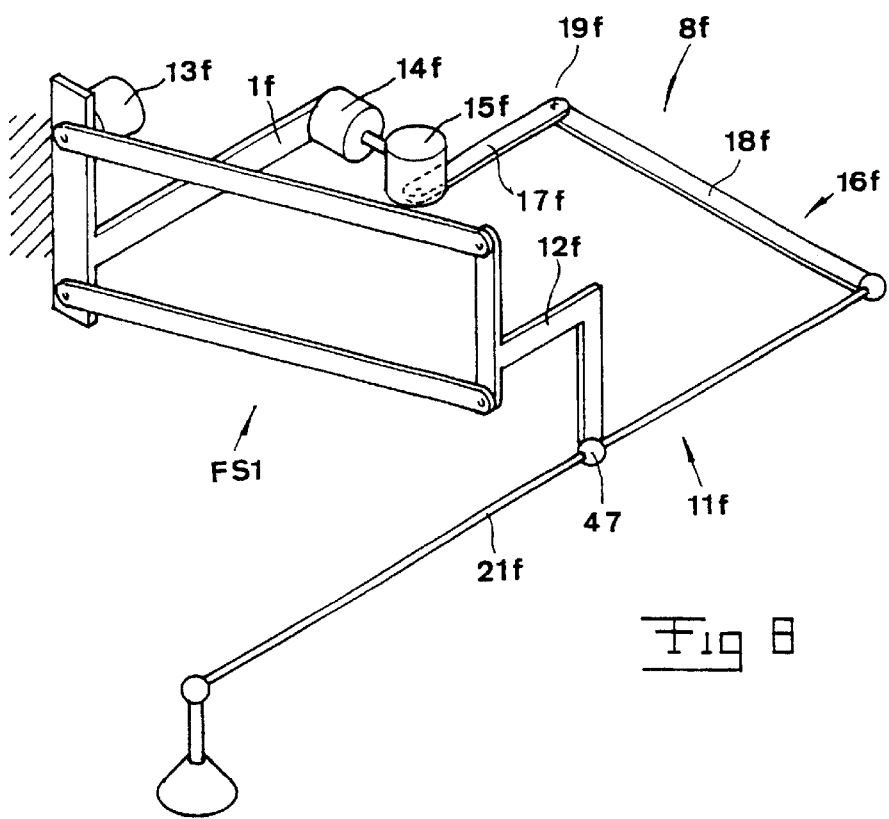
Figure 10:
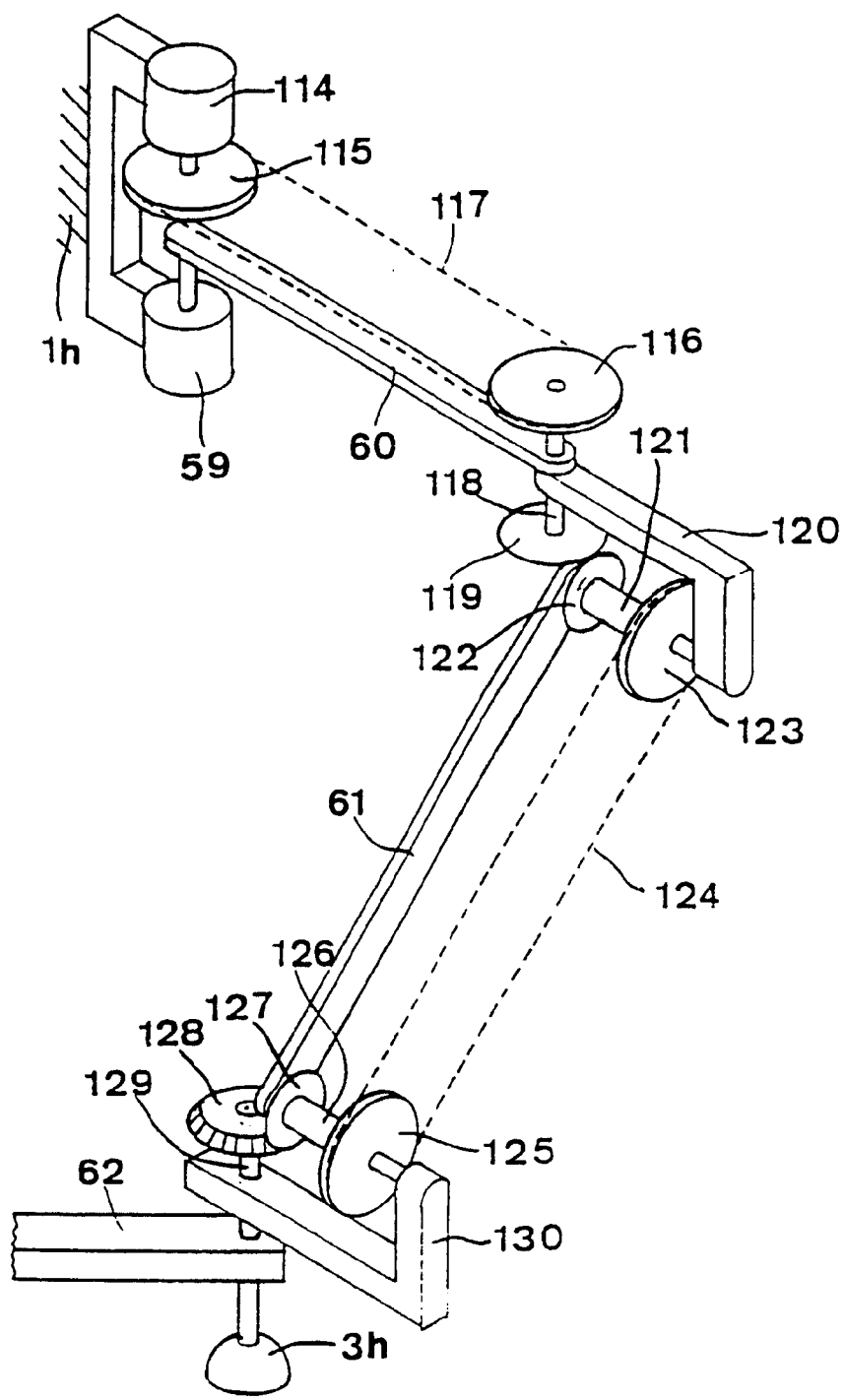

FIG. 3 is perspective view of a robot similar to the one in FIGS. 1 and 2, but in a modified embodiment, FIG. 4 is a schematical view similar to the one in FIG. 1, but with modifications relating to design and function, FIG. 5 is a perspective view illustrating an embodiment where three force-applying arrangements comprise force-exerting members arranged with stationary portions fixed to the first element and movable portions arranged to actuate the pivot arm arrangement via link arm arrangements, FIG. 6 is a view in perspective of an earlier alternative, FIG. 7 is a perspective view of an alternative, where the pivot arm arrangement is situated closest to the first element, FIG. 8 is a perspective view of yet another embodiment, where a pivot arm arrangement is pivotable in all directions in relation to a connection arrangement, which is connected to the first element via a four-links system, FIG. 9 is a schematical perspective view illustrating a robot provided with a transmission intended for turning a working member arranged on a pivot arm arrangement, FIG. 10 is a perspective view illustrating an alternative transmission capable of transmitting drive force between two link members pivotable in all directions in relation to each other, FIG. 11 is a schematical and perspective view illustrating how double force transmission may be realised at a joint with two degrees of freedom, more closely freedom to relative pivoting about two axes inclined in relation to each other, FIG. 12 is a perspective view of an embodiment similar to the one in FIG. 10, but in a somewhat modified condition, and FIG. 13 is a perspective view of an alternative similar to the embodiment in FIG. 8.

DETAILED DESCRIPTION OF PREFERRED EMBODIMENTS

In order to simplify the understanding, like reference characters have been used in the following in different embodiments for similar or corresponding components but with addition of letters specific to the embodiments.

The robot illustrated in FIG. 1 is intended for relative displacement of two elements 1, 2. The element 1 is in the example intended to form a base member, relative to which the element 2 is intended to be positioned in space. The element 2 is intended to carry, either directly as indicated in FIG. 1, or, as will be dealt with later, indirectly via a carrying arrangement, a working member 3.

The robot comprises articulated links 4, 5 provided between the elements 1, 2 and force-applying arrangements 6, 7, 8 for applying force for the relative displacement of the elements.

The articulated links 4, 5 form in addition to two further links 9, 10 a four-links system FS1. The robot comprises further a pivot arm arrangement 11 and a connection arrangement 12 for mutual connection of the four-links system FS1 and the pivot arm arrangement 11.

The links 4, 5; 9, 10 are in the example comprised in the four-links system FS1 parallel in pairs, and accordingly of equal length. Thus, the four-links system FS1 forms parallelogram.

A first 6 of the force-applying arrangements is provided to pivot the link 4 and hence also the link 5 of the four-links system in first planes in order to change the form of the four-links system. These planes extend more closely substantially parallel to the planes, in which the links in the four-links system FS1 are arranged.

The force-exerting arrangement 6 comprises a force-exerting member with a stationary portion rigidly connected to the link 9 and a movable portion rotationally rigid connected to the link 4. The force-exerting member is more closely formed by a rotary means, the stator thereof being connected to the link 9 and the rotor thereof being connected to the link 4.

A second force-applying arrangement 7 is arranged to pivot the four-links system FS1 in other planes forming an angle, preferably substantially right angle, with the first planes. The force-applying arrangement 7 comprises a force-exerting member with a stationary portion rigidly connected to the element 1 and a movable portion rotationally rigid connected to the link 9. The force-exerting member is in the example formed by a rotary means with a stator rigidly connected to the element 1 and a rotor connected to the link 9. The rotary means comprised in the arrangements 6, 7 are denoted 13 and 14 respectively and their rotation axes are in the example extending with an angle, preferably substantially right angle in relation to each other. It should be noted that the rotary means 13 will follow the link 9 in the example when the four-links system FS1 is pivoted by means of the rotary means 14.

A third 8 of the force-applying arrangements is arranged to actuate the pivot arm arrangement 11 in order to cause it to pivot. The arrangement 8 comprises a force-exerting member 15 with a stationary portion fixed in relation to the element 1 and a movable portion arranged to actuate the pivot arrangement 11. More closely, a link arm arrangement 16 is arranged between the movable portion of the force-exerting member 15 and the pivot arm arrangement 11. This pivot arm arrangement comprises in the example an arm 17 rigidly connected to the movable portion of the force-exerting member 15 and a link arm 18 hingedly connected to the arm 17 and to the pivot arm arrangement 11 via joints 19 and 20 respectively. These joints must allow pivoting of the link arm 18 in all directions in relation to the arm 17 and the pivot arm arrangement 11 respectively, i.e. the joints must allow a relative pivoting movement about pivot axes inclined in relation to each other. Thus, the joints could be realised by means of cardan couplings. They could also be realised by means of ball joints, which implies that a further degree of freedom in the form of relative rotation is added.

The four-links system FS1 is in FIG. 1 arranged between the connection arrangement 12 and the element 1 and the pivot arm arrangement 11 is arranged between the second element 2 and the connection arrangement 12.

The pivot arm arrangement 11 is in the example performed by a simple pivot arm 21. The connection arrangement 12 has the character of a structure, which in a hinged manner connects the pivot arm 21 to the link 10 comprised in the four-links system FS1.

The pivot arm 21 has two arm parts 22 and 23 respectively located on each side of the pivot axis of the pivot arm denoted 24, wherein a first arm part 22 is connected to the second element 2 and a second arm part 23 is connected to the link arm arrangement 16 via the joint 20. The pivot arm 21 is pivotably connected to the connection arrangement 12 and the link 10 with one single degree of freedom. The pivot axis 24 of the pivot arm 21 is in the example directed so that the pivot arm 21 receives pivotability in planes substantially perpendicular to planes, in which the links 4, 5 of the four-links system are pivotable.

It is in FIG. 1 illustrated a third link 25 forming other four-links systems together with each of the other links 4, 5. This third link is connected to the element 1 by means of a joint 26 and to the link element 28 via a joint 27, said link element 28 being connected to the link 10 in the four-links system FS1 via joint 29. Since the form of FS1 may be changed in its own plane by pivoting the links 4, 5 and besides may be rotated in a rotation plane perpendicular to said pivoting plane, it is required that the joints 26, 27 of the link 25 are so arranged that the link 25 may pivot in all directions in relation to the element 1 and the link element 28 respectively. Joints with at least two non-parallel pivot axes or ball joints will thus be of interest. The link element 28 is however pivotably connected to the link 10 of the four-links system FS1 with one single degree of freedom, i.e. the joint 29 allows pure pivoting about an axis. This axis must run perpendicularly to the adjacent joint axes of the four-links system in order to cause a parallelogram-function. This requires in addition that the link 25 is substantially parallel to the links 4, 5 and has substantially the same length as they have.

Thus, the working member 3 may by means of the robot illustrated in FIG. 1 be adjusted in Z-direction by means of the rotary means 13. The working member 3 may further be adjusted in the XY-plane by means of a suitable operation of at least one of and suitably both of the rotary means 14, 15.

The alternative illustrated in FIG. 2 corresponds regarding the substantial parts with the previous embodiment. The difference is in the first place that the link/link element denoted 25 and 28 respectively in FIG. 1 are not present in this case. These components are thus not necessary but may be added when there is a need for further stability of the four-links system FS1. The robot has in absence of those components a more slender design and besides a greater working area.

The alternative in FIG. 3 is closely related to the embodiment according to FIG. 2. There are mainly only two differences; the first difference is that the pivot arm 21a is connected to the link arm 18a in the area between the ends of the pivot arm, i.e. the pivot arm 21a is connected to the connection arrangement 12a with one of its ends and its other end carries the working member 3a. The second difference is that also the force-exerting member 13a is fixed with the stationary portion thereof in relation to the first element 1a. The movable portion (drive axis) of the member 13a has instead a gear wheel 30, which drives a further gear wheel 31 rigidly connected to one 4a of the links in the four-links system FS1 in an inclined relation thereto. The gear wheels 30, 31 form in other words an angular gear, which permits this rotation when the links 4a and 5a are rotated about the rotation axis denoted 32 by means of the force-exerting member 14a provided that the force-exerting member 13a by rotation by means of the member 14a is driven to follow with the same angular velocity. The movable portion of the force-exerting member 14a is rotationally rigid connected to the link 9a as previously, said link 9a being hingedly connected to the links 4a, 5a. It should hereby be noted that the gear wheel 31 suitably is rotationally mounted in relation to the link 9a.

The alternative illustrated in FIG. 4 differs from the embodiment according to FIG. 1 by means of that each of the articulated links 4b, 5b and 25b is connected to the first element 1b and the connection arrangement 12b respectively, which in this case, and also in the previous embodiment, may be regarded comprising the link 10b, by means of joints permitting the links to pivot in all directions in relation to the first element 1b and the connection arrangement 12b. It should also be noted that the component 28b, which in the embodiment according to FIG. 1 had the character of a link element hinged in relation to the link 10, in this case forms a rigid component of the connection arrangement 12b. It is however within the scope of the embodiment according to FIG. 4 to also utilise the embodiment shown there.

It has already been mentioned that the joints 26b, 27b are arranged so that they permit pivoting of the link 25b in all directions in relation to the element 1b and the connection arrangement 12b. Thus, it is here referred to joints with double, angularly disposed pivot axes, for example cardan joints, or ball joints. Corresponding considerations are valid for the joints denoted 33 between the links 4b, 5b and the element 1b and the connection arrangement 12b respectively. The articulated connection of the link 4b to the element 1b is however somewhat special as a consequence of that the articulated connection takes place via the force-exerting members 13b, 14b in on principle the same way as already have been discussed. Thus, the link 4b will be connected to the element 1b via the rotation axes of the two force-exerting members 13b, 14b, which extend substantially perpendicularly to each other. Thus, the rotation axes of the members 13b, 14b will provide the universal pivotability of the link 4b in relation to the element 1b provided of course that the members 13b, 14b permit the pivoting movements in question.

Thus, the discussion above implies that the link 9 present in the embodiments according to FIG. 1 and comprised in the four-links system FS1 in the embodiment according to FIG. 4 will be formed by the element 1b itself in combination with the force-exerting members 13b, 14b.

Two degrees of freedom are obtained in FIG. 1 between the link 5 and the first element 1 by the link between 5 and 9 in combination with the rotation axis of the member 14.

Two degrees of freedom are obtained in FIG. 4 for the link 5b by the joint 33.

The alternative illustrated in FIG. 5 differs from the preceding alternatives by way of not only the force-applying arrangement 8c but also the force-applying arrangements 6c and 7c comprise link arm arrangements 16c, 34 and 35 respectively, through which the force-exerting members 13c, 14c and 15c respectively actuate the second element 2c. The link arm arrangements 34, 35 comprise respective arms 36,37 in similarity to what is valid for the link arm arrangement 16c, said arms being rotationally rigid connected to movable portions of the respective force-exerting members 13c, 14c and links 38 and 39 respectively connected between these arms 36, 37 and the second element 2c. From what has already been described regarding the link arm 18c, the link arms 38, 39 are also hingedly connected in relation to the arms 36 and 37 respectively and the element 2c (the pivot arm 21c) via joints permitting pivoting of the link arms in all directions. It is once again concerning ball joints or other joint constructions, such as cardan joints, permitting pivoting about two pivot axes angularly displaced in relation to each other.

It is in the embodiment according to FIG. 5 in the first place the force-applying arrangement 6c, which effects movement of the second element 2c in Z-direction. The arrangement 7c effects movement in Y-direction while the arrangement 8c effects movement in X-direction.

It is in FIG. 5 illustrated how the pivot arm 21c is provided with a stabilising bar 40 causing the articulated base of the pivot arm 21c becoming comparatively wide and therefor stabile in relation to the connection element 12c.

The four-links system FS1 is in the alternative according to FIG. 6 arranged between the connection arrangement 12d and the second element 1d. The pivot arm arrangement 11d is pivotable in relation to the connection arrangement 12d about a pivot axis denoted 41, which in this case, although it is not necessary, is substantially parallel to the pivot plane of the four-links system FS1. The latter may be pivoted by means of the force-exerting member 13d.

The pivot arm arrangement 11d is in this case pivotable in relation to the connection arrangement 12d by means of a joint arrangement generally denoted 42 permitting pivoting of the pivot arm arrangement 11d in all directions in relation to the connection arrangement 12d. The pivot arm arrangement 11d is in this embodiment in reality formed as a further four-links system comprising a further link 43, except for the link 21d, which corresponds to the previously mentioned pivot arm 21, said link 43 in addition to two further links 44, 45 forming a four-links system in said way. It is thereby pointed out that the links 21d and 43 are pivotable in relation to the link 45, which is the one to be rotatable about the previously mentioned axis 41. By means of the pivotability of the links 21d and 43 in relation to the link 45 and the rotatability thereof about the axis 41, the pivoting freedom of the pivot arm arrangement 11d in relation to the connection arrangement 12d is thereby provided in all directions.

The second element 2d is not arranged directly on the pivot arm 21d in this embodiment, but instead on the link denoted 44, which is partly carried by the arm 21d. This implies that the direction of the elements 2d in space will be maintained as a consequence of that two four-links systems in reality will be coupled in series, but by a relative pivoting movement of the four-links systems about the axis 41, the rotation position of the second element 2d will on the other hand be displaced. Force-applying arrangements 7d and 8d respectively with force-exerting members 14d and 15d are in this case, just as in the previous case according to FIG. 5, prevailing, which are connected to the second element 2d, here the link 44, via link arm arrangements 35d and 16d respectively in order to operate the same. It is in the first place the force-applying arrangement 8d operating the second element 2d in Z-direction in the figure while the arrangement 7d is pivoting the pivot arm arrangement 11d about the axis 41, which in FIG. 6 is substantially vertical so that the element 2d is displaced in X-direction. The force-applying arrangement 7d is finally displaceable via the element 2d of the FS1 in Y-direction.

The four-links system FS1 is provided between the connection arrangement 12e and the second element 2e in the alternative according to FIG. 7, and the pivot arm arrangement 11e is provided between the first element 1e and the connection arrangement 12e. The force-exerting member 15e effects pivoting of the pivot arm 21e about the axis denoted 46 and it causes the force-exerting member 13e to follow due to that the stator thereof is rotatably rigid connected to the rotor of the member 15e. The force-exerting member 14e has on the other hand its stator connected to the first element 1e.

Thus, the four-links system FS1 may be relocated by the pivot arm 21e so that the element 2e is displaced in Y-direction. The member 13e causes a pivoting movement in Z-direction of FS1 and the element 2e via the associated link arm arrangement. The force member 14e causing FS1 to pivot in horizontal direction via the associated link arm arrangement, i.e. substantially parallel to the pivoting plane of the pivot arm 21e so that the element 2e is displaced in X-direction.

The alternative in FIG. 8 mainly corresponds to the alternative in FIGS. 2 and 3 except for that the pivot arm 21f of the pivot arm arrangement is connected to the connection arrangement 12f by means of a joint 47 allowing pivoting of the pivot arm 21f in all directions in relation to the connection arrangement 12f. The force-applying arrangement 8f with the force-exerting member 15f and the associated link arm arrangement 16f serve for operating the pivot arm 21f in the horizontal plane. A further moment is in this case that the pivot arm 21f also may be pivoted in the vertical plane and more closely with the aid of the force-exerting member 14f, which is connected to the second element 1f with a stationary portion thereof and carrying the force-exerting member 15f with a movable portion thereof. The members 14f and 15f have their respective rotation axes running in an angle in relation to each other, more closely in a substantially right angle so that the pivot arm 21f thus may be pivoted as desired in space. This requires that the joint 19f between the arm 17f of the link arm arrangement 16f and the link arm 18f is arranged with only one degree of freedom, namely pivotability about one single axis. This axis should be substantially parallel to the pivoting axis of the member 15f, but inclined, suitably with substantially right angle, to the rotation axis of the member 14f. The four-links system FS1 may with the aid of the force-exerting member 13f also be pivoted vertically in order to change the vertical position of the pivot arm 21f.

In an embodiment illustrated in FIG. 9, a four-links system FS1 is vertically pivotable by means of the force-exerting member 13g and a pivot arm 21g is horizontally pivotable in relation to the connection arrangement 12g with the aid of the force-exerting member 15g. A transmission 49 for rotation of the working member 3g arranged on the link 9g and driven by a drive motor 48 comprises force transmitting members in the form of shafts 51 and/or traction transmitting elements 52 placed around diverting wheels 53,54 extending along the four-links system FS1 (the link 5g thereof) and the pivot arm 21g and angular gear members 55 provided between these shafts/diverting wheels for force transmission without effecting the relative movement between the pivot arm 21g and FS1. A shaft 51 is in the example extending along the link 5g, said shaft having a gear wheel driven by the motor 48 at one end thereof. The device is suitably arranged so that a gear wheel of the motor 48 and the shaft 51 respectively form a first angular gear. A gear wheel 56 at the other end of the shaft 51 is arranged in driving connection to a gear wheel 57, in the example via third gear wheel 58 forming an angular gear with each of the other gear wheels 56, 57. A shaft rigidly fixed to the gear wheel 57 is rotationally rigid connected to the break wheel denoted 53 so that by rotation thereof the traction transmitting element 52 will cause the diverting wheel 54 to rotate and thereby the working member 3g to turn. The working member may thereby be adjusted as desired. It is to be noted that naturally the diverting wheels 53, 54 and the traction-transmitting element 52 could be replaced by a gear arrangement with required shafts. The shaft 51 could similarly besides associated gear wheels be replaced by diverting wheels with traction transmitting elements.

The force-exerting member 14g is in the example arranged to turn the FS1 around via the link 9g. The motor 48 arranged on the link 9g will thereby follow. The member 15g is suitably arranged substantially coaxially with the member 14g.

It is to be noted that the solution illustrated in FIG. 9 naturally is applicable on the embodiments according to all the described alternatives according to FIGS. 1–8.

It is in FIG. 10 illustrated a further embodiment suitable to obtain turning of the working member 3h on the basis of the first element 1h so that its adequate turning position may be adjusted. Such an adjustment of turning position may also be required for different manipulative tasks which the working member is to carry out, which should be apparent from the discussion above, but the adjustment is usually also desirable by that the pivotable embodiment of the robot means that the working member 3h will change turning positions in space by such a pivoting movement.

It is in FIG. 10 illustrated how a force-exerting member 59 has a stationary portion fixed by the first element 1h and a movable portion connected to an arm 60. An arm pivotable in relation to the same is denoted 61. An arm or a link pivotable in relation to the same is denoted 62. By suitable driving of the force-exerting member 59, the working member 3h may thus be displaced via the arms 60, 61.

A drive motor 114 is located on the first element 1h in order to generate energy for turning the working member 3h. The drive motor 114 has a stationary portion connected to the element 1h and a movable portion, here in the form of a drive shaft, arranged to cause the drive wheel 115 to rotate. A further wheel 116 is rotatably mounted on the outer end of the arm 60 and a traction-transmitting element 117 is placed around these two wheels 115, 116 in the form of a loop. The wheel 116 is connected to a shaft 118 and a conical gear wheel 119 is fixed thereon. The shaft 118 is rotatable in relation to the outer end of the arm 60. A support element 120 is also mounted round the shaft 118, which is movable around the shaft 118 with one degree of freedom, i.e. pure turning. This support member 120 is with one degree of freedom pivotably connected to a shaft 121, which is also rotatable in relation to the arm 61. A conical gear wheel 122 and a wheel 123 are rotationally rigid connected to the shaft 121, wherein a traction transmitting element 124 in the form of a loop is placed round the wheel 123, said element 124 also being placed round a further wheel 125 being rotationally rigid connected to a shaft 126 mounted in the arm 61 at an outer end thereof.

The gear wheels 119 and 122 form together an angular gear in that the shafts 118 and 121 extend substantially perpendicularly in relation to each other. The shaft 126 carries a rotationally rigid connected conical gear wheel 127, which is in engagement with a conical gear wheel 128 forming a further angular gear, said conical gear wheel 128 being rotationally rigid connected to the working member 3h. The gear wheel 128 is rotationally rigid arranged on a shaft 129. The shaft extends perpendicularly in relation to the shaft 126. A further support element 130 is mounted to the two shafts 126 and 129 with a single degree of freedom, i.e. pure turning.

The embodiment according to FIG. 10 operates in the following way: the arm 60 may be turned by actuating the force-exerting member 59 and the arm 61 may thereby be caused to turn. The described connections/force transmissions via the angular gears and the support elements 120 and 130 pivotably connected to the gear wheel shafts implies that the transition between the arm 60 and the arm 61 on one hand and between the arm 61 and the arm 62 on the other hand, there is obtained movability in two degrees of freedom, namely turning in two in relation to each other perpendicular axes. This implies that the arm 60 rotatable in a plane may be caused to operate the arm 62 also when the latter is disposed away from the rotation plane for the arm 60, which is indicated in FIG. 10. The drive wheel 115 will be caused to rotate by driving of the drive motor 114. The drive wheel 115 drives the traction-transmitting element 117 in the form of a belt, line, wire or chain around so that also the wheel 116 is caused to rotate. The shaft 121 is caused to rotate via the angular gear 119/122 and this also leads to rotation of the wheel 123, which will drive the wheel 125 via the element 124 so that the shaft 126 is caused to rotate. This will cause turning of the working member 3h via the angular gear 127, 128.

It is to be noted that the embodiment according to FIG. 10 is applicable by all the embodiments according to FIGS. 1–9. The arm denoted 60 in FIG. 10 may for example thereby be formed by the arm denoted 17 in earlier figures while the arm denoted 61 in FIG. 10 could be formed by the link arm 18. The arm denoted 62 could thereby be formed by the pivot arm 21 itself or possibly by the link denoted 44. The force member 59 should then correspond to the member denoted 17.

A fundamental solution for achieving double force transmission between two parts of the device pivotable round double, non-parallel shafts in relation to each other is illustrated in FIG. 11. Force transmission could in comparison with the force transmission between the arm 60 and the arm 61 illustrated in FIG. 10 with guidance of the embodiment according to FIG. 11 take place twice. The explanation thereto is that double sets of traction-transmitting elements 131, 132 driven by separate drive motors and placed over a respective drive wheel 133, 134 are arranged in FIG. 11. The shaft 135 at the wheel 134 is formed as a tube shaft while the shaft 136 of the other wheel 133 extends through the tube shaft 135. The tube shaft 135 is provided with a first conical gear wheel 137 and the shaft 136 is provided with a second conical gear wheel 138 on its end extending through the tube shaft 135. The gear wheel 137 connected to the tube shaft 135 is in engagement with a conical gear wheel 139 placed on a tube shaft 140 forming an angular gear. A wheel 141 is rigidly connected to the tube shaft 140 and a traction-transmitting element 142 is placed over the wheel 141 and driven by the same.

A further conical gear wheel 143 is in engagement with the gear wheel 138, the gear wheel 143 being fixed to a shaft 144 extending through the tube shaft 140 and being connected to a wheel 145 driving a traction-transmitting element 146, which runs further to a wheel (not shown) driven thereby, which is also the question for the element 142.

The transmission shown in FIG. 11 thereby permits double force transmission and a joint with two degrees of freedom is simultaneously formed, i.e. a joint permitting turning around two angularly disposed shafts. The transmission may be utilised for providing the associated robot structure with two degrees of freedom. The components 131, 133, 136, 138, 143, 144, 145 and 146 may for example be utilised for turning the working member 3 around and the other components may be utilised for another degree of freedom of the robot, for example displacing a part carrying the working member 3.

It is to be noted that the shafts 135,136 and 140, 144 respectively naturally not need to be driven by and drive respectively diverting wheels for traction-transmitting elements. Gear wheels may instead of the diverting wheels be arranged on said shafts 135, 136 and 140, 144, which via corresponding gear wheels arranged on rotatable shafts could be capable of effecting the corresponding driving function and driven function respectively.

It is in FIG. 12 illustrated an alternative to the embodiment discussed by guidance of FIG. 10. Shaft transmissions 146, 147 arranged along the arms 60i and 61i are utilised instead of traction transmitting elements and them driving wheels and wheels driven by them respectively for force transmission. This implies that further angular gear functions have to be arranged in the joint transitions in ways apparent from FIG. 12.

The alternative illustrated in FIG. 13 is similar to the one in FIG. 8 except for that the pivot arm arrangement 11j is of a more complex nature in similarity to what is the case for example in the embodiment according to FIG. 6. The pivot arm arrangement 11j in FIG. 13 forms more closely an articulated four-links system where the pivot arm 21j forms one of the links. The connection arrangement 12j is in this case connected to the pivot arm arrangement 11j by means of a joint arrangement 47j formed by two in relation to each other angularly disposed pivot axes 47ja and 47jb. The pivot axis 47jb thereby connects a link 45j comprised in the four-links system 11j so that said link may be turned in relation to the connection arrangement 12j with only one degree of freedom. The pivot axis 47ja connects the pivot arm 21j to the link 45j, also here with only one degree of freedom. The remaining links in the four-links system are denoted 43j and 44j respectively.

The working member 3j is in the example connected to the link 44j in the four links system 11j. It suitably forms a parallelo-gram.

The pivot axis 47jb is in the example substantially parallel to the pivot plane for FS1. This is however not required. The axes 47ja and 47jb are suitably perpendicular in relation to each other.

Thus, the four-links system 11j is pivotable around the axis 47jb in relation to the connection arrangement 12j by means of the force member 14j in a way similar to what has been discussed regarding FIG. 8 and the pivot arm 21f illustrated there. The pivot arm 21j is by means of the force member 15j pivotable in relation to the link 45j around the axis 47ja. The force transmission in FIG. 13 between the force member 14j and the pivot arm 21j is arranged in on principle the same way as what has been described regarding FIG. 8.

In common for all the described embodiments is that a suitable control unit, especially in the form of a computer, is arranged to control the force-exerting members of the different robot embodiments in order to cause the second element 2 or thereto directly or indirectly connected members 3 in desired movement paths.

POSSIBLE MODIFICATIONS

It is evident that the invention is not only restricted to the embodiments discussed hereinabove. Thus, detailed adaptations of the embodiments may be carried out depending on the circumstances without leaving the inventive concept appearing from claim 1.

It is further noted that the idea illustrated in FIG. 3, to cause the four-links system FS1 to pivot by means of an angular gear function between one of the links in the four-links system and the associated force-exerting member 13a of course is applicable on the embodiments according to FIGS. 1, 2 and 4. The primary advantage with such an arrangement is that the force-exerting member 13 no longer needs to follow when the four-links system is turned around by means of the force-exerting member 14. Thus, the mass needed to be caused to move and thereto related inertias will be reduced.

What is claimed is:

1. A device for relative displacement of two elements (1, 2) comprising: articulated links (4, 5) connected between the elements; first, second and third force-applying arrangements (6, 7, 8) for applying force to displace the elements, the articulated links forming at least one four-links system (FS1), at least one pivot arm arrangement (11), the four-links system and the pivot arm arrangement being mutually connected by means of a connection arranged (12), said first (6) of the force-applying arrangements pivoting links (4, 5) of the four-links system in first planes in order to change the shape of the four-links system, said third (8) of the force-applying arrangements pivoting the pivot arm arrangement (11) the pivot arm arrangement (11) being pivotable in planes which are at an angle to the first planes, in which the links (4, 5) of the four-links system (FS1) are pivotable in response to said force-applying arrangement, the four-links system (FS1) being arranged between the connection arrangement and the first element (1) formed as a base member, the pivot arm arrangement (11) being arranged between the second element (2) and the connection arrangement (12); the first and/or third force-applying arrangement (6, 8) comprising a force-exerting member having a stationary portion connected to the first element and a movable portion adapted to actuate the second element via a link arm arrangement (16, 34).

2. A device according to claim 1, wherein the four-link system (FS1) is a parallelogram.

3. A device according to claim 1, wherein the second (7) of the force-applying arrangements pivot links (4, 5) of the four-links system (FS1) in second planes, which are inclined in relation to the first planes.

4. A device according to claim 1, wherein the second (7) of the force applying arrangements comprises a force-exerting member having a stationary portion connected to the first element (1) and a movable portion adapted to actuate the second element (2) via a link arm arrangement (35).

5. A device according to claim 1, wherein the link arm arrangement (16; 34, 35) is connected to the pivot arm arrangement (11).

6. A device according to claim 5, wherein the pivot arrangement (11) comprises at least one pivot arm (21).

7. A device according to claim 6, wherein the pivot arm (21) has two arm parts (22, 23) situated on each side of a pivot axis (24), wherein a first arm part is connected to the second element (2) and a second arm part is connected to the link arm arrangement (16).

8. A device according to claim 6, wherein the pivot arm arrangement (21, 21a, 21b) is pivotably connected to the connection arrangement with only one degree of freedom.

9. A device according to claim 1, wherein the pivot arm arrangement (11f, 11j) is connected to the connection arrangement (12f, 12j) by means of an articulated arrangement (47, 47j) allowing pivotability of the pivot arm arrangement in all directions.

10. A device according to claim 1, wherein the first force-applying arrangement (6a) for pivoting links (4, 5) of the four-links system (FS1) affects at least one of these links via an angular gear (30, 31).

11. A device according to claim 10, wherein each of the articulated links (4b, 5b, 25b) is pivotably connected to the first element (1b) and the connection arrangement (12b), respectively in all directions.

12. A device according to claim 1, wherein there at least three articulated links two of them included in said four-links system and the third link forms additional four-links systems with each of the two links.

13. A device according to claim 1, wherein the pivot arm arrangement (11d, 11j) is arranged as a third four-links system having two links (43, 43j 21d, 21j) extending from the connection arrangement (12d, 12j), said links being pivotable in all directions in relation to the connection arrangement.

14. A device according to claim 1, further comprising a transmission driven by a drive motor (48, 59) on the first element (1g, 1h) for turning a working member (3g, 3h) comprises force-transmitting members in the form of axes (51, 146) and/or traction transmitting elements (52, 117) placed around diverting wheels, extending along arms and between the axes/diverting wheels for transmitting force without imparting on the movability of the device.

15. A device according to claim 1, further comprising double sets of motion transmitting elements (131, 132, 142, 146) driven by separate drive motors are provided for double force transmission between two parts of the arrangement pivotable in relation to each other about double non-parallel axes, that the motion transmitting elements are in operationable engagement with a tube axis (135) and an axis (136) extending through the tube axis, that the axis and the tube axis respectively being provided with angular gear wheels, which in addition to corresponding gear wheels of a further set of axis/tube axis (140, 142) connected to motion transmitting elements are able to form a join pivotable about double non-parallel axes, the engaging angular gear wheels (138, 143; 137, 139) being able to operate force transmittingly spanning via said joint as a consequence of that the gear wheels form an intermediate angular gear.

16. A device according to claim 15, wherein the motion transmitting elements are axes provided with gear wheels arranged to engage with gear wheels arranged on the axes/tube axes.

17. A device according to claim 15, wherein the motion transmitting elements are traction transmitting elements (131, 132; 142, 146) placed over diverting wheels connected to the axes and the tube axes, respectively.

18. A device according to claim 1, comprising an industrial robot, the second element (2) of which is intended to carry, directly or indirectly, a working member (3).

* * * * *

UNITED STATES PATENT AND TRADEMARK OFFICE
CERTIFICATE OF CORRECTION

PATENT NO. : 6,336,374 B1
DATED : January 8, 2002
INVENTOR(S) : Torgny Brogårdh et al.

It is certified that error appears in the above-identified patent and that said Letters Patent is hereby corrected as shown below:

<u>Title page,</u>
Item [22], PCT Filed: insert -- January 14, 1998, -- and delete "January 14, 1997".

Signed and Sealed this

Twentieth Day of August, 2002

*Attest:*

JAMES E. ROGAN
*Attesting Officer*       *Director of the United States Patent and Trademark Office*